(12) United States Patent
Thomas et al.

(10) Patent No.: US 10,471,930 B2
(45) Date of Patent: Nov. 12, 2019

(54) MISROUTED SEATBELT WEBBING

(71) Applicant: GM GLOBAL TECHNOLOGY OPERATIONS LLC, Detroit, MI (US)

(72) Inventors: Scott D. Thomas, Novi, MI (US); Dorel M. Sala, Troy, MI (US); Tricia E. Morrow, Grosse Pointe, MI (US); Senthil Karuppaswamy, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 15/820,726

(22) Filed: Nov. 22, 2017

(65) Prior Publication Data
US 2019/0152430 A1 May 23, 2019

(51) Int. Cl.
*B60R 22/48* (2006.01)
*G05D 1/02* (2006.01)

(52) U.S. Cl.
CPC ........ *B60R 22/48* (2013.01); *B60R 2022/485* (2013.01); *B60Y 2400/301* (2013.01); *G05D 1/021* (2013.01)

(58) Field of Classification Search
CPC .. B60R 22/48; B60R 2022/485; G05D 1/021; B60Y 2400/301
See application file for complete search history.

(56) References Cited

U.S. PATENT DOCUMENTS

| | | | | |
|---|---|---|---|---|
| 6,203,059 | B1 * | 3/2001 | Mazur | B60R 22/48 280/735 |
| 6,439,333 | B2 * | 8/2002 | Domens | B60R 21/33 180/268 |
| 7,576,642 | B2 * | 8/2009 | Rodemer | A61B 5/02438 280/735 |
| 10,227,057 | B2 * | 3/2019 | Seyffert | B60R 21/01566 |
| 2015/0251618 | A1 * | 9/2015 | Ghannam | B60R 22/48 340/457.1 |
| 2015/0338849 | A1 * | 11/2015 | Nemec | G05D 1/0055 701/25 |

(Continued)

FOREIGN PATENT DOCUMENTS

EP 2937251 A1 * 10/2015 ............ B60R 22/48
JP 06239200 A * 8/1994

(Continued)

*Primary Examiner* — Darlene P Condra
(74) *Attorney, Agent, or Firm* — Lorenz & Kopf, LLP

(57) ABSTRACT

In accordance with various embodiments, methods, systems, and vehicles are provided. In various embodiments, the vehicle includes a body; one or more occupant seats disposed within the body for an occupant of the vehicle; and, for each occupant seat, a restraint device, one or more sensible elements, and one or more sensors. The restraint device is configured to provide restraint for the occupant when the restraint device is properly worn by the occupant. The one or more sensors are disposed within the occupant seat. The one or more sensible elements are disposed as part of the restraint device. The one or more sensors are disposed within the occupant seat, and are configured to sense the one or more sensible elements when the one or more sensible elements are in proximity to the one or more sensors, as an indication that the restraint device is not properly worn by the occupant.

20 Claims, 10 Drawing Sheets

(56) References Cited

U.S. PATENT DOCUMENTS

| | | | |
|---|---|---|---|
| 2016/0159320 A1* | 6/2016 | Andreen | B60R 22/48 |
| | | | 382/103 |
| 2017/0088096 A1* | 3/2017 | Luebbers | B60R 21/01544 |
| 2018/0086303 A1* | 3/2018 | McCoy | B60R 21/01512 |
| 2018/0162319 A1* | 6/2018 | Moenkemoeller | G01V 3/08 |
| 2018/0222441 A1* | 8/2018 | Koase | B60R 22/48 |
| 2018/0326994 A1* | 11/2018 | Sakai | B60W 50/082 |
| 2018/0345903 A1* | 12/2018 | Ishibashi | B60R 22/48 |
| 2018/0361975 A1* | 12/2018 | Nagata | B60R 22/44 |

FOREIGN PATENT DOCUMENTS

| | | | | |
|---|---|---|---|---|
| JP | 08011679 A | * | 1/1996 | |
| JP | 11005513 A | * | 1/1999 | |

\* cited by examiner

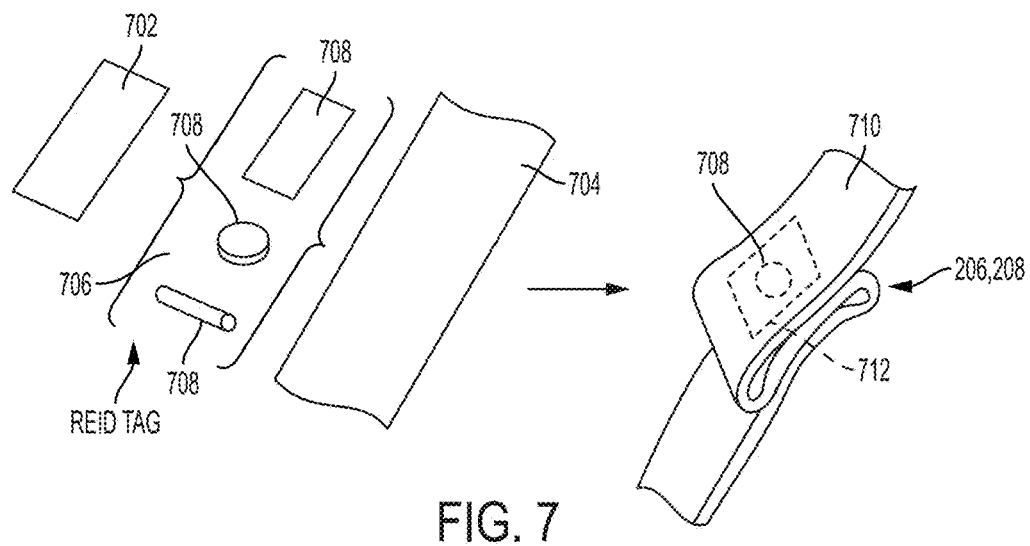
FIG. 7
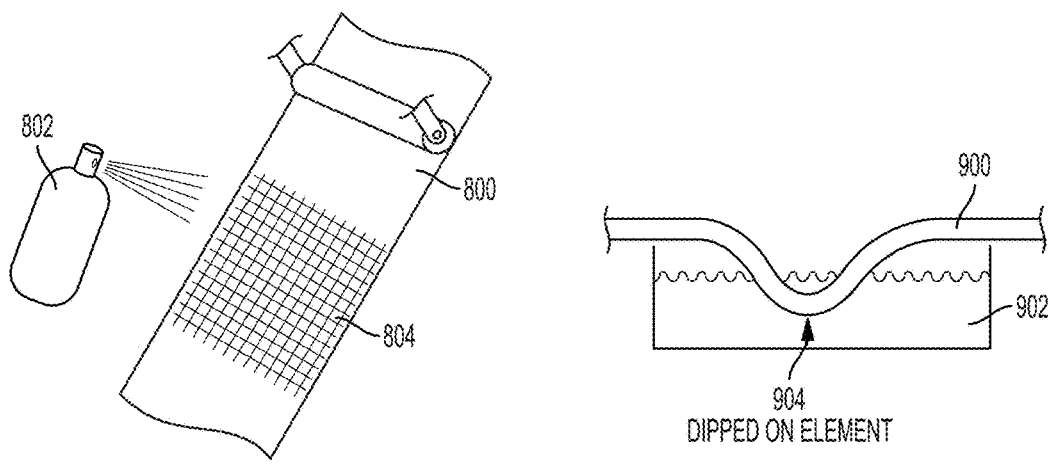
FIG. 8
FIG. 9
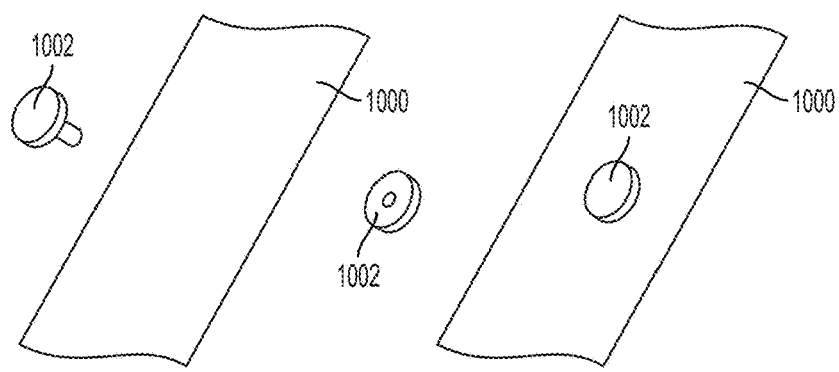
FIG. 10

US 10,471,930 B2

MISROUTED SEATBELT WEBBING

TECHNICAL FIELD

The technical field generally relates to the field of vehicles and, more specifically, to methods and systems for determining when vehicle restraint devices (e.g., seat belts) are misrouted, for example for use in autonomous vehicles.

INTRODUCTION

Many vehicles today include restraint devices and systems (e.g., seat belts) for occupants of the vehicle. However, in certain situations, it may be difficult for the vehicle to determine whether an occupant's restraint device is properly applied across the occupant. This may be particularly important, for example, with autonomous vehicles in which a human driver may not be present to check the occupant's restraint devices.

Accordingly, it is desirable to provide methods and systems for determining whether an occupant's restraint device is properly applied across the occupant, for example for use in autonomous vehicles. Furthermore, other desirable features and characteristics of the present invention will become apparent from the subsequent detailed description and the appended claims, taken in conjunction with the accompanying drawings.

SUMMARY

In accordance with certain exemplary embodiments, a system is provided. The system includes one or more sensible elements and one or more sensors. The one or more sensible elements are disposed as part of a restraint device of an occupant seat of a vehicle. The restraint device is configured to provide restraint for an occupant of the occupant seat when the restraint device is properly worn by the occupant. The one or more sensors are disposed within the occupant seat, and are configured to sense the one or more sensible elements when the one or more sensible elements are in proximity to the one or more sensors, as an indication that the restraint device is not properly worn by the occupant.

Also in certain embodiments, the one or more sensors are disposed in one or more of the following regions of the occupant seat: a seat back, a seat bottom, and a joint between the seat back and the seat bottom.

Also in certain embodiments, the one or more sensors include a plurality of sensors disposed in one or more of the following regions of the occupant seat: the seat back, the seat bottom, and the joint between the seat back and the seat bottom.

Also in certain embodiments, the one or more sensible elements are disposed in a shoulder belt of the restraint device; and the one or more sensible elements are configured to detect routing of the shoulder belt.

Also in certain embodiments, the one or more sensible elements are disposed in a lap belt of the restraint device; and the one or more sensible elements are configured to detect routing of the lap belt.

Also in certain embodiments, the one or more sensible elements are disposed in a latch plate of the restraint device: and the one or more sensible elements are configured to detect the location of a latch plate and thus the seatbelt routing. Also in certain embodiments, wherein the one or more sensors are further configured to detect a stowed latch plate of the restraint device when the restraint device is not worn and is in a stowed state.

Also in certain embodiments, the one or more sensible elements are one of a) placed in proximity to, b) embedded into, and c) attached to a webbing of the restraint device.

Also in certain embodiments, one or more sensors disposed within the occupant seat do not sense (below a detection threshold) the one or more sensible elements in a restraint device when the restraint device is properly worn by the occupant.

Also in certain embodiments, one or more sensors disposed within the occupant seat do sense (above a detection threshold) the one or more sensible elements in a restraint device when the restraint device is improperly worn by the occupant.

Also in certain embodiments, the response strength from the sensor varies with the distance of the sensible element to the sensor with a stronger response for a closer distance than for a longer distance.

Also in certain embodiments, the one or more sensible elements include one of a metallic sensible element, a magnetic sensible element, and an RFID tag.

Also in certain embodiments, the one or more sensible elements include a sensing element pattern in proximity to the webbing that is detected by the one or more sensors.

Also in certain embodiments, the system further includes a processor configured to take an action when the restraint device is not properly worn by the occupant.

Also in certain embodiments, the system further includes the restraint device.

Also in certain embodiments, the system further includes the occupant seat.

In certain other embodiments, a vehicle is provided. The vehicle includes a body; one or more occupant seats disposed within the body for an occupant of the vehicle; and, for each occupant seat, a restraint device, one or more sensible elements, and one or more sensors. The restraint device is configured to provide restraint for the occupant when the restraint device is properly worn by the occupant. The one or more sensors are disposed within the occupant seat. The one or more sensible elements are disposed as part of the restraint device. The one or more sensors are disposed within the occupant seat, and are configured to sense the one or more sensible elements when the one or more sensible elements are in proximity to the one or more sensors, as an indication that the restraint device is not properly worn by the occupant.

Also in certain embodiments, the vehicle also includes a processor that is configured to take an action when the restraint device is not properly worn by the occupant.

Also in certain embodiments, the vehicle includes an autonomous vehicle; and the processor is configured to prevent movement of the autonomous vehicle when the restraint device is not properly worn by the occupant.

In certain other embodiments, a method is provided. The method includes: (i) detecting, via one or more sensors disposed within an occupant seat of a vehicle, one or more sensible elements that are disposed as part of a restraint device of the vehicle, wherein the restraint device is configured to provide restraint for an occupant of the occupant seat when the restraint device is properly worn by the occupant; and (ii) taking an action, via a processor, when the restraint device is not properly worn by the occupant Also in certain embodiments, the vehicle includes an autonomous vehicle; and the step of taking the action includes not allowing movement of the autonomous vehicle when the restraint device is not properly worn by the occupant.

DESCRIPTION OF THE DRAWINGS

The present disclosure will hereinafter be described in conjunction with the following drawing figures, wherein like numerals denote like elements, and wherein:

FIGS. 5-10 are schematic diagrams of exemplary techniques for embedding or otherwise attaching the sensible elements within the restraint devices for the vehicle of FIG. 1, in accordance with exemplary embodiments;

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
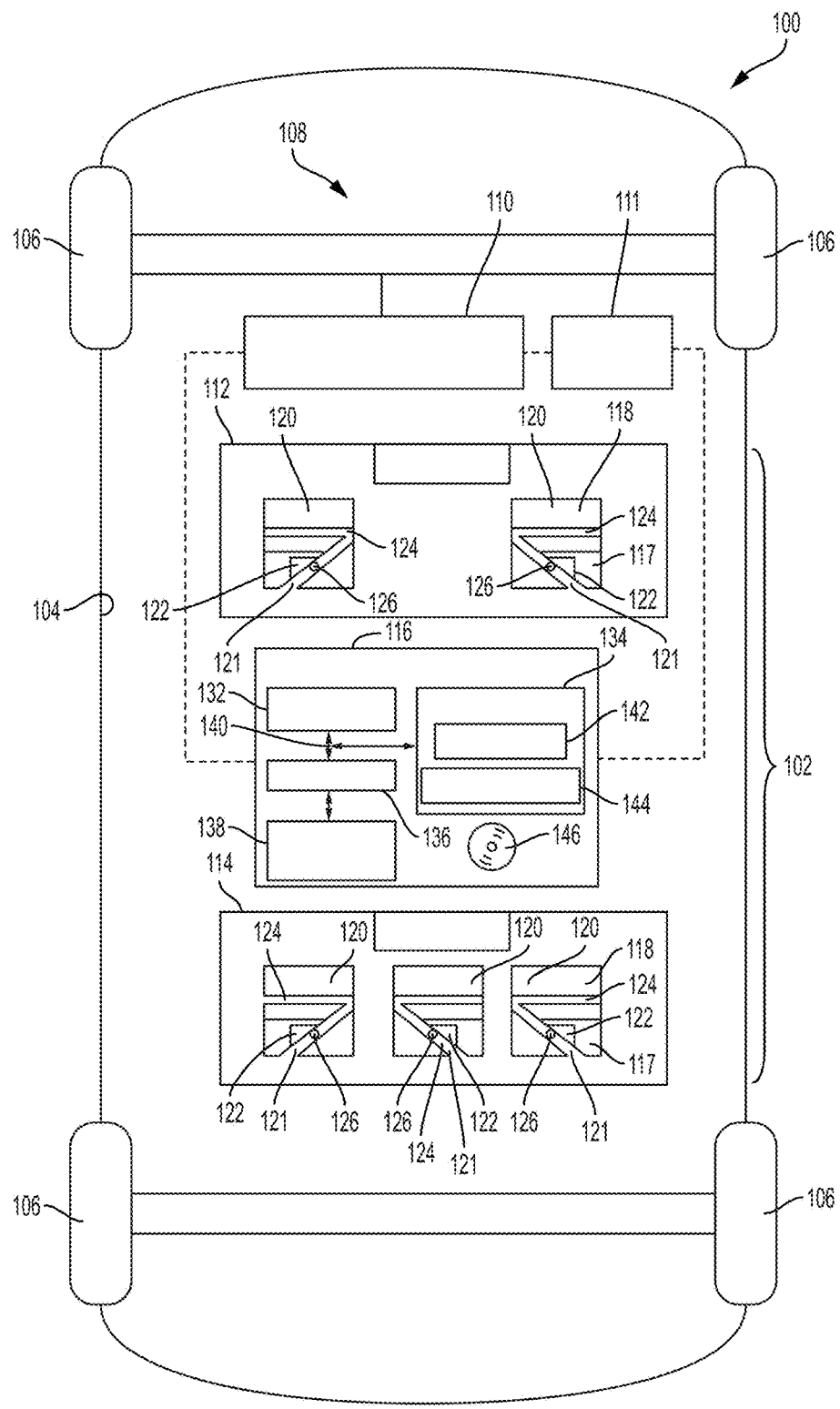
FIG. 1 is a functional block diagram of a vehicle that includes a control system that includes one or more restraint devices for occupants of the vehicle, along with detection apparatus for detecting when the restraint devices are properly applied across the occupants, the detection apparatus including sensors disposed within the seats and sensible elements disposed as part of the restraint devices that are sensed by the sensors, in accordance with exemplary embodiments.

FIG. 1 illustrates a vehicle 100, according to an exemplary embodiment. As described in greater detail further below, the vehicle 100 includes a control system 102 that includes front and/or rear seats 112, 114 having one or more restraint devices 124 for occupants of the vehicle, along with sensors 122 and sensible elements 126 for detecting when the restraint devices 124 are properly applied across the occupants. The front and/or rear seats 112 can be oriented to face the same direction (as shown) or could be oriented to face other directions. In addition, the quantity of seats can be different than shown.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

In various embodiments, the vehicle 100 includes a body 104 that is arranged on a chassis 108. The body 104 substantially encloses other components of the vehicle 100. The body 104 and the chassis 108 may jointly form a frame. The vehicle 100 also includes a plurality of wheels 106. The wheels 106 are each rotationally coupled to the chassis 108 near a respective corner of the body 104 to facilitate movement of the vehicle 100. In one embodiment, the vehicle 100 includes four wheels 106, although this may vary in other embodiments (for example for trucks and certain other vehicles). While vehicle 100 is depicted in the illustrated embodiment as a passenger car, it should be appreciated that any type of vehicle, including motorcycles, trucks, sport utility vehicles (SUVs), autonomous vehicles, recreational vehicles (RVs), marine vessels, aircraft, and other movable platforms employing a restraint device may also employ the various methods and systems described herein.

A drive system 110 is mounted on the chassis 108, and drives the wheels 106. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

Also, as depicted in FIG. 1, one or more input sensors 111 receive inputs from the occupants of the vehicle 100 such as the location and size of each occupant. In various embodiments, the input sensors 111 receive inputs as to a desired beginning of operation of the vehicle 100, such as when the occupant is ready to travel and the vehicle 100 and/or drive system 110 are to be turned on in a driving mode for movement of the vehicle 100. In certain embodiments, the input sensors 111 may comprise one or more vehicle ignition sensors (e.g., that sense when an ignition key is turned, a vehicle start button is engaged, and so on), one or more receivers and/or associated sensors (e.g., that receive a message from a keyfob, smartphone, or other device to begin operation of the vehicle 100), one or more touch screens and/or associated sensors (e.g., that receive an occupant's input or an outside the vehicle remote input to begin operation of the vehicle 100), and so on In certain embodiments, vehicle 100 is characterized by some level of autonomy. For example, vehicle 100 may correspond to a level four or level five automation system under the Society of Automotive Engineers (SAE) "J3016"

standard taxonomy of automated driving levels. Using this terminology, a level four system indicates "high automation," referring to a driving mode in which the automated driving system performs all aspects of the dynamic driving task within a geo-fenced area, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories and fully apply to conventional non-autonomous transportation means. Furthermore, construction detection systems in accordance with the present embodiment may be used in conjunction with any vehicle that utilizes a navigation system to provide route guidance. Furthermore, in certain embodiments, vehicle 100 may be a traditional, non-autonomous vehicle.

As depicted in FIG. 1, in various embodiments, the control system 102 includes some or all of the following: one or more front seats 112, one or more rear seats 114, seat belt systems 121 for the front and/or rear seats 112, 114, and a controller 116. In certain embodiments, this may vary. For example, in certain embodiments, the vehicle 100 may include front seats 112 but not rear seats 114. In other embodiments, the number of front seats 112 and/or rear seats 114 may vary. Also in various embodiments, the front seats 112 and/or rear seats 114 may be separate from, and/or as part of a different system than, the controller 116 and/or the control system 102, among other possible variations. In addition, more than two rows of seats may be present in various embodiments.

In various embodiments, each of the front seats 112 and rear seats 114 includes one or more seating regions 120, each having one or more respective seat belt systems 121. In various embodiments, the seating regions 120 include a seat back 117 and a seat bottom 118. Also in various embodiments, each seat belt system 121 includes one or more sensors 122, restraint devices 124, and sensible elements 126. In certain embodiments, each restraint device 124 comprises one or more seat belt devices that include a shoulder belt, a lap belt, or both. Also in various embodiments, the one or more sensors 122 are disposed within seats of the seating region 120, and each restraint device 124 includes one or more sensible elements 126 therein that are disposed as part of the restraint device 124 and that are detected by the sensors 122.

Accordingly, in various embodiments, the restraint device 124 may be determined to be properly routed (e.g., properly applied and worn by the occupant) when the sensible elements 126 are not detected by the respective sensors 122 (e.g., because the sensible elements 126 are away from the sensors 122 when the restraint device 124 is properly worn by the occupant, for example because the sensors 122 would likely be on the opposite side of the occupant than the sensor 122 location). Similarly, in various embodiments, the restraint device 124 may be determined to not be properly routed (e.g., improperly applied and/or worn by the occupant) when the sensible elements 126 are detected by the respective sensors 122 (e.g., because the sensible elements 126 are in proximity to the sensors 122 when the restraint device 124 is not properly worn by the occupant as the occupant's body or the seatbelt routing approach could place the sensible elements 126 on the seatbelt system 121 near the seat 112, 114 which would contain the sensors 122). In various embodiments, the sensors 122 are configured to detect proper routing and misrouting of shoulder belts, lap belts, or both, of the seat belt system 121 and/or data to provide such determinations. In various embodiments, the sensors 122 are further configured to detect a stowed latch plate 125 of the restraint device 124 when the restraint device 124 is not worn and is in a stowed state (for example to avoid false-positive results when an occupant is not in the seat 112, 114). This approach may eliminate the need for a conventional latch plate sensor in the seatbelt buckle to detect a buckled versus an unbuckled state.

Various embodiments of the seats 112, 114 and accompanying components, including the restraint devices 124, sensors 122, and sensible elements 126, are discussed further below in connection with FIGS. 2-18. Also in various embodiments, the term "seat belt" (or "seat belt device" or "seat belt system") may also be used throughout the Application to refer to either the restraint device 124 itself, or in combination with one or more other components of the control system 102 (e.g., the sensors 122 and/or the sensible elements 126).

With continued reference to FIG. 1, in various embodiments the controller 116 controls operation of the control system 102, for example as described further below in connection with the method 1800 depicted in FIG. 18. Also in various embodiments, the controller 116 makes various determinations based on sensor data obtained from the input sensors 111 and the sensors 122 of the control system 102, and takes various actions based on whether the restraint devices 124 are properly worn by the occupants of the vehicle, also as described further below in connection with the method 1800 depicted in FIG. 18. For example, in various embodiments, the controller 116 may prohibit operation or movement of the vehicle 100 until the restraint devices 124 are properly routed and/or worn, and/or may provide notices and/or other actions based on whether the restraint devices 124 are properly routed and/or worn, and so on.

As depicted in FIG. 1, the controller 116 comprises a computer system. In certain embodiments, the controller 116 may also include one or more other components of the control system 102 and/or the vehicle 100 (such as the sensors 122 and/or the sensible elements 126, and so on). In addition, it will be appreciated that the controller 116 may otherwise differ from the embodiment depicted in FIG. 1. For example, the controller 116 may be coupled to or may otherwise utilize one or more remote computer systems and/or other control systems, for example as part of one or more of the above-identified vehicle 100 devices and systems.

In the depicted embodiment, the computer system of the controller 116 includes a processor 132, a memory 134, an interface 136, a storage device 138, and a bus 140. The processor 132 performs the computation and control functions of the controller 116, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 116 and the computer system of the controller 116, generally in executing the processes described herein, such as the process 1800 described further below in connection with FIG. 18 as well as the implementations discussed further below in connection with FIGS. 2-17.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144.

The bus 140 serves to transmit programs, data, status and other information or signals between the various components of the computer system of the controller 116. The interface 136 allows communication to the computer system of the controller 116, for example from a system driver and/or another computer system, and can be implemented using any suitable method and apparatus. In one embodiment, the interface 136 obtains various data such as input data from the input sensors 111 and/or sensor data from the sensors 122.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 142 that executes one or more embodiments of one or more processes of the present disclosure, such as the steps of the process 1800 (and any sub-processes thereof) described further below in connection with FIG. 18. In another exemplary embodiment, the program product may be directly stored in and/or otherwise accessed by the memory 134 and/or a disk (e.g., disk 146), such as that referenced below.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 116 may also otherwise differ from the embodiment depicted in FIG. 1, for example in that the computer system of the controller 116 may be coupled to or may otherwise utilize one or more remote computer systems and/or other control systems.

Figure 2:
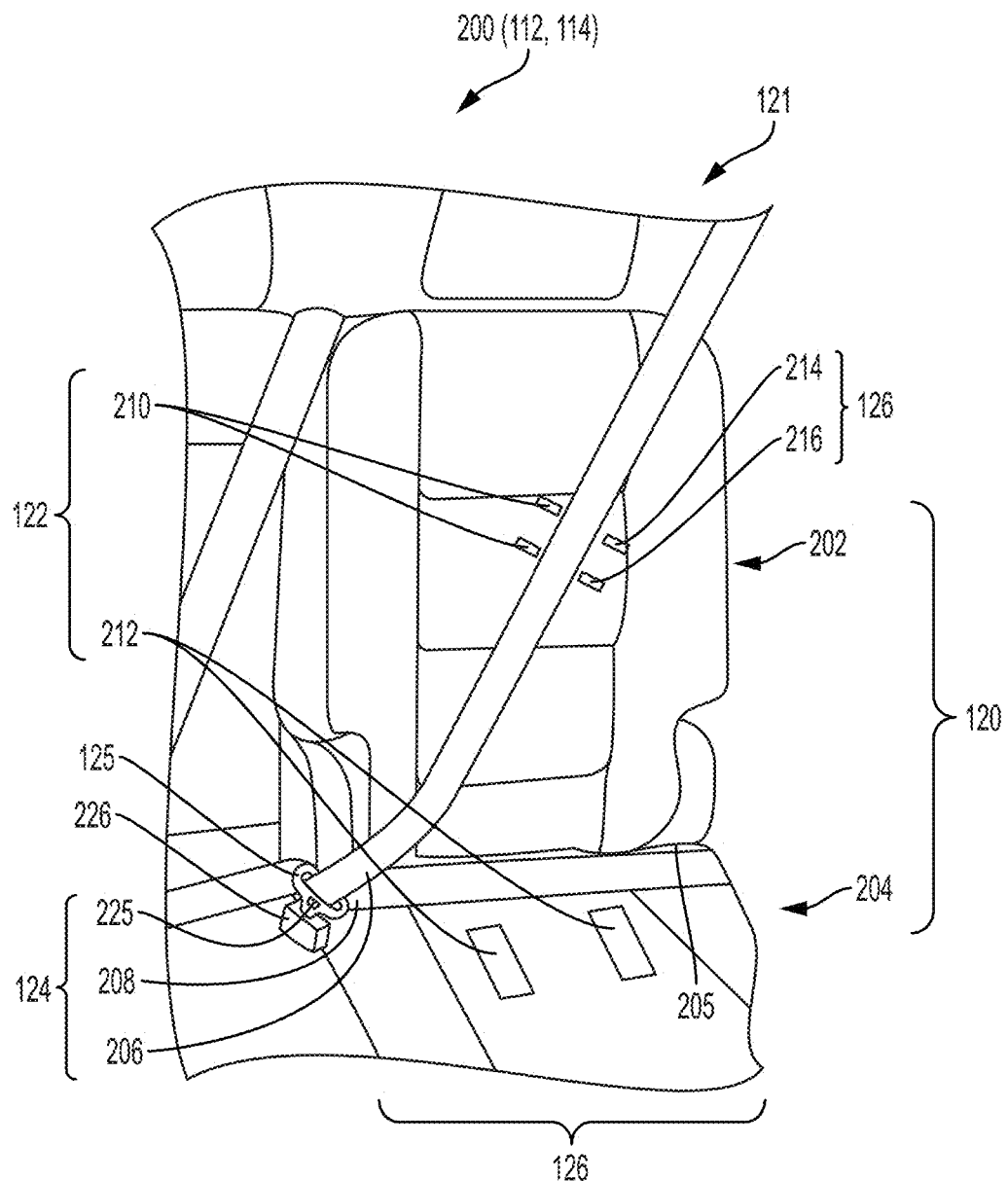
FIG. 2 is a schematic diagram of an exemplary seat and accompanying restraint device of the vehicle of FIG. 1, including a shoulder belt, a lap belt, sensors embedded within the seat, and sensible elements embedded with the shoulder belt and lap belt that are sensed by the sensors in detecting when the restraint device is properly applied across an occupant, in accordance with exemplary embodiments.

FIG. 2 is a schematic diagram of an exemplary seat 200 and accompanying seat belt system 121 of the vehicle 100 of FIG. 1, in accordance with various embodiments. In various embodiments, the seat 200 comprises one of the front seats 112 or rear seats 114 of the vehicle 100 of FIG. 1. As depicted in FIG. 2, in various embodiments, the seat 200 includes a seat back 202 and a seat bottom 204. In various embodiments, the seat back 202 corresponds to a seat back 117 of FIG. 1, and the seat bottom 204 corresponds to a seat bottom 118 of FIG. 1. Also in various embodiments, a joint 205 separates the seat back 202 and the seat bottom 204.

Also, as depicted in FIG. 2, in various embodiments, the restraint device(s) 124 of FIG. 1 include a shoulder belt 206 and a lap belt 208. In various embodiments, shoulder belt sensible elements 214 are included on or within the shoulder belt 206, and lap belt sensible elements 216 are included on or within the lap belt 208. In various embodiments, the shoulder belt sensible elements 214 and the lap belt sensible elements 216 collectively comprise the sensible elements 126 of FIG. 1. In certain embodiments, the sensible elements 126 may include shoulder belt sensible elements 214 without lap belt sensible elements 216, or vice versa. In various embodiments, latch plate sensible elements 225 are included on or within the latch plate 125. In certain embodiments, sensible elements 126 may include latch plate sensible elements with or without any combination of the shoulder belt sensible elements 214 and lap belt sensible elements 216. Also shown in FIG. 2 is a buckle 226 for receiving the latch plate 125.

Also in various embodiments, the sensors 122 of FIG. 1 comprise shoulder belt sensors 210 and lap belt sensors 212, as depicted in FIG. 2. In various embodiments, the shoulder belt sensors 210 are disposed along portions of the seat back 202 where the shoulder belt 206 is in proximity to or makes contact when it is buckled and not worn such as when it is displaced into the seat bottom and seat back by an occupant sitting on top of it. Also in various embodiments, the lap belt sensors 212 are disposed in one or more of the following locations: (i) in a lower portion of the seat back 202 where the lap belt 208 is in proximity to or makes contact; (ii) in the seat bottom 204; and/or (iii) in the joints 205 that separates the seat back 202 and the seat bottom 204. In various embodiments, the number and/or location of the sensors 122 may vary. Also in certain embodiments, one or more seats 200 may include shoulder belt sensors 210 without lap belt sensors 212, or vice versa.

Figure 3A:
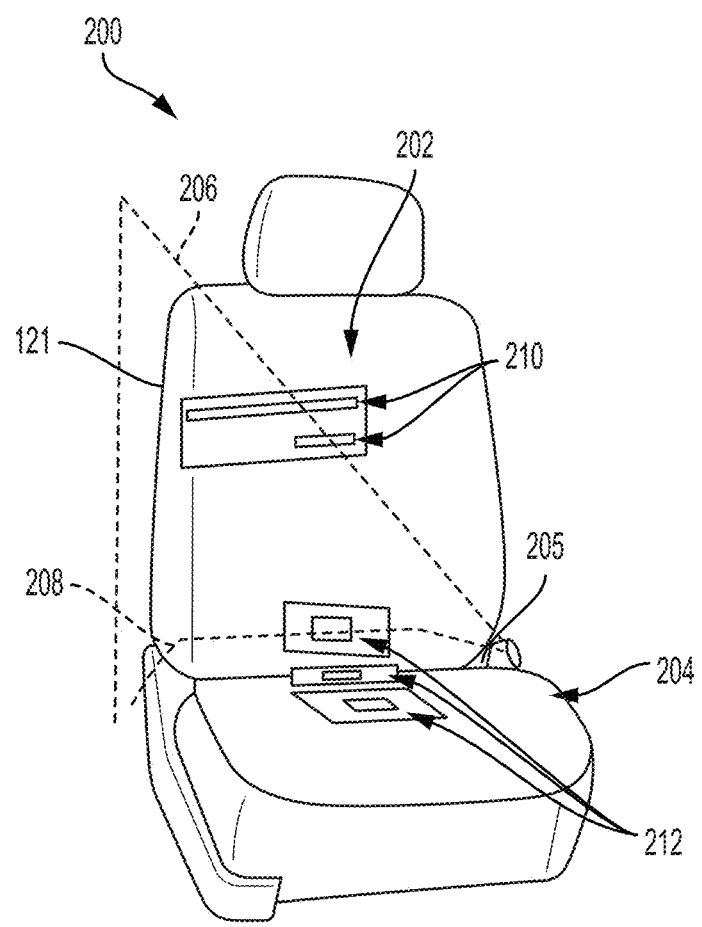
FIGS. 3A and 3B are schematic diagrams of the exemplary seat and accompanying seat belt system of FIG. 2, in accordance with exemplary embodiments.

FIG. 3A is a schematic diagram of the exemplary seat 200 and accompanying seat belt system 121 of FIG. 2, in accordance with various embodiments. The diagram of FIG. 3A shows placement of the sensors 210, 212 within the seat 200, in accordance with exemplary embodiments. Specifically, FIG. 3A depicts multiple shoulder belt sensors 210 disposed in an upper region of the seat back 202 where the shoulder belt 206 is in proximity to or makes contact, in accordance with certain exemplary embodiments. In this case the shoulder belt sensible elements 214 would be in proximity to the sensors 210 when the seatbelt is buckled and the shoulder belt 206 routes diagonally across the seat. These small distances would provide a larger, above sensing threshold signal to the sensors 210 who would in turn deliver a large magnitude response or a response indicating an incorrectly routed seatbelt in various embodiments. For example, in various embodiments, if an occupant was sitting on top of the seatbelt so that the shoulder belt 206 was behind his or her person, then the gap between the sensors 210 and the sensible elements 214 would be reduced further increasing the ability to sense this seatbelt routing state.

FIG. 3A also depicts multiple lap belt sensors 212 disposed in (i) in a lower portion of the seat back 202 where the lap belt 208 is in proximity to or makes contact; (ii) in the seat bottom 204; and/or (iii) in the joints 205 that separates the seat back 202 and the seat bottom 204, in accordance with various embodiments. In this case, in various embodiments the lap belt sensible elements 216 would be in proximity to the sensors 212 when the seatbelt is buckled and the lap belt 208 routes horizontally across the seat. In various embodiments, these small distances would provide a larger, above sensing threshold signal to the sensors 212 who would in turn deliver a large magnitude responses or a response indicating an incorrectly routed seatbelt. For example, in various embodiments, if an occupant was sitting on top of the seatbelt so that the lap belt 208 was behind or under his or her person, then the gap between the sensors 212 and the sensible elements 208 may be reduced further increasing the ability to sense this seatbelt routing state.

Figure 3B:
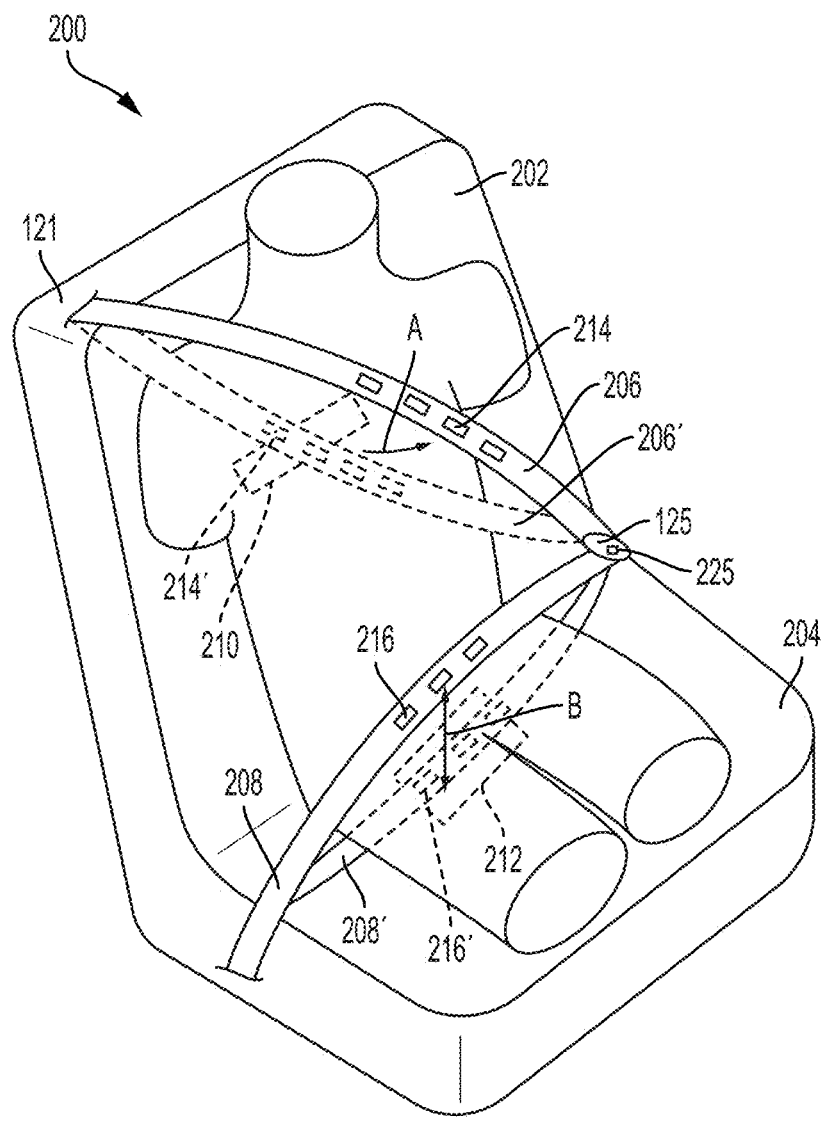

FIG. 3B is a partial schematic diagram of the exemplary seat 200, the accompanying seatbelt system 121 of FIG. 2 and an occupant 203, in accordance with various embodiments. Two different seatbelt system 121 routings are shown. Shoulder belt 206 is shown routed over the occupant 203 as is lap belt 208, demonstrating proper routing of the seatbelt system 121. In this case, in various embodiments, the shoulder belt sensible elements 214 have a great distance including the occupant thickness (represented by Arrow A) to the shoulder belt sensors 210 and the lap belt sensible elements 216 have a great distance including the occupant thickness (represented by Arrow B) to the lap belt sensors 212. In various embodiments, these large distances would provide a small, below sensing threshold signal to the sensors 210, 212 who would in turn deliver a small magnitude responses or a responses indicating a correctly routed seatbelt.

Shoulder belt 206' is shown routed behind occupant 203 and lap belt 208' is shown routed under occupant 203, demonstrating two incorrect seatbelt system 121 portion routings in accordance with various embodiments. In this case, in certain embodiments, the shoulder belt sensible elements 214' have a small distance to the shoulder belt sensors 210 and the lap belt sensible elements 216' have a small distance to the lap belt sensors 212. These small distances would provide a larger, above sensing threshold signal to the sensors 210, 212 who would in turn deliver a large magnitude responses or responses indicating an incorrectly routed seatbelt. In accordance with various embodiments, it is noted that the shoulder belt sensors and the lap belt sensors can be assessed individually where if either one provides a large magnitude response or a response indicating an incorrectly routed seatbelt, the system would classify the routing as an incorrectly routed seatbelt.

Figure 4:
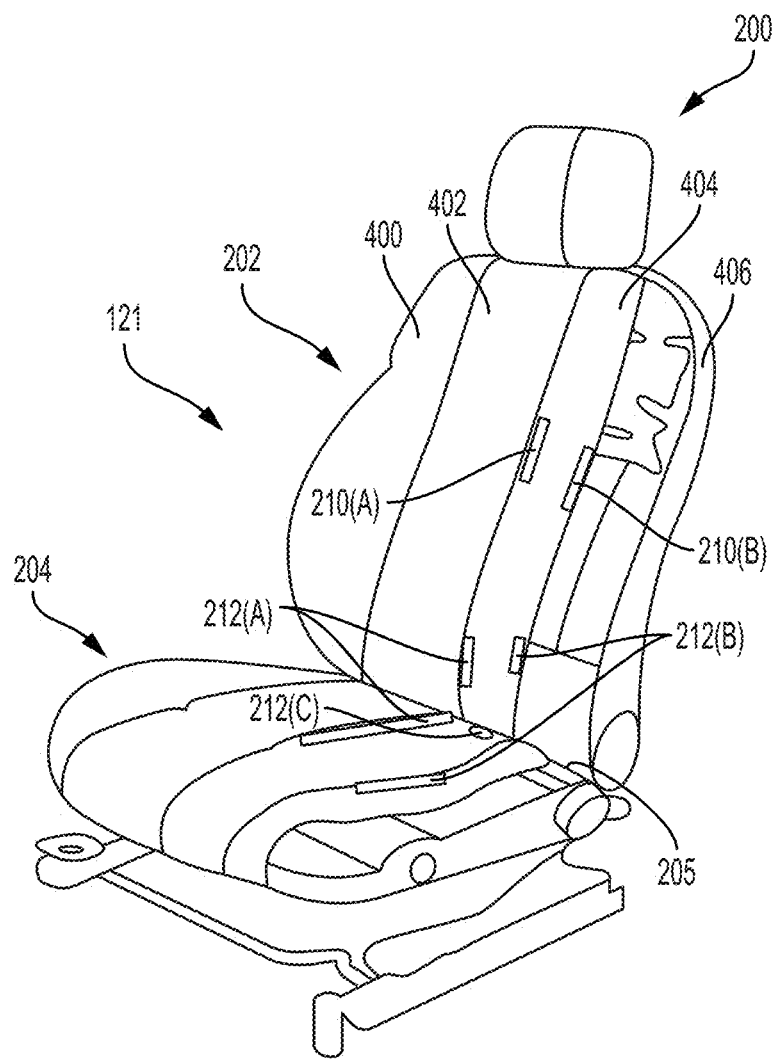
FIG. 4 is another schematic diagram of the exemplary seat and accompanying seat belt system of FIG. 2, showing internal layers of the seat in connection with interior placement of the sensors within the seat, in accordance with exemplary embodiments.

FIG. 4 is another schematic diagram of the exemplary seat 200 and accompanying seat belt system 121 of FIG. 2, in accordance with various embodiments. The diagram of FIG. 4 shows placement of the sensors 210, 212 within the seat 200 of FIG. 2, showing internal layers of the seat 200 in connection with interior placement of the sensors 210, 212 within the seat 200, in accordance with exemplary embodiments. As depicted in FIG. 4, in various embodiments, the seat 200 includes an outermost surface 400, a cushion surface 402, a foam surface 404, and a seat structure 406.

Also, as depicted in FIG. 4, in various embodiments, certain shoulder belt sensors 210 (or arrays of sensors) and lap belt sensors 212 (or arrays of sensors) are disposed at one or more first surfaces 210(A) and 212(A), respectively, that are disposed between the outer surfaces 400, 402 and the foam surface 404. Also in certain embodiments, certain shoulder belt sensors 210 (or arrays of sensors) and lap belt sensors 212 (or arrays of sensors) are also disposed at one or more second surfaces 212(B) and 210(B), respectively, that are disposed between the foam surface 404 and the seat structure 406. In addition, in certain embodiments, one or more lap belt sensors 212 (or arrays of sensors) are also disposed at one or more third surfaces 212(C) in the joint 215 between the seat back 202 and the seat bottom 204. As noted above, it will be appreciated that the number and/or placement of the sensors 210, 212 may differ in various embodiments.

As depicted in FIGS. 2-4, the sensors 210, 212 may be disposed in any number of locations within the occupant seat 200, including the seat back 202, the seat bottom 204, and the joint 205. In certain embodiments, the sensors 122 extend to a portion of the seat 200 where the restraint device 124 (e.g., the shoulder belt 206 and/or lap belt 208) is adjacent to the sensors 122 when in a stowed/not worn state, and the sensors 122 are configured to detect the presence of the restraint device 124 in this state. In various embodiments, the sensors 210, 212 are aligned within the seat 200 and with respect to the sensible elements 214, 216 such that a re-routing of the restraint devices 124 (e.g., shoulder belt 206 and/or lap belt 208) or a latch plate 125 adjacent to at least one of the seat back 202, the seat bottom 204, and/or the joint 205 would be detected. In addition, in various embodiments, the sensors 210, 212 may comprise one or more radio frequency identification (RFID) sensors and/or readers; reed sensing systems, hall effect sensing systems, other magnetic sensors, inductive sensing systems, radiated field detectors, and/or one or more other types of sensors and/or associated devices and/or systems. Also in various embodiments, an array of sensors 210, 212 are utilized, for example for detecting one or more patterns and/or different locations for the sensible elements 214, 216.

FIGS. 5-10 are schematic diagrams of exemplary techniques for locating the sensible elements 126 within the restraint devices 124 for the vehicle 100 of FIG. 1, in accordance with exemplary embodiments.

Figure 5:
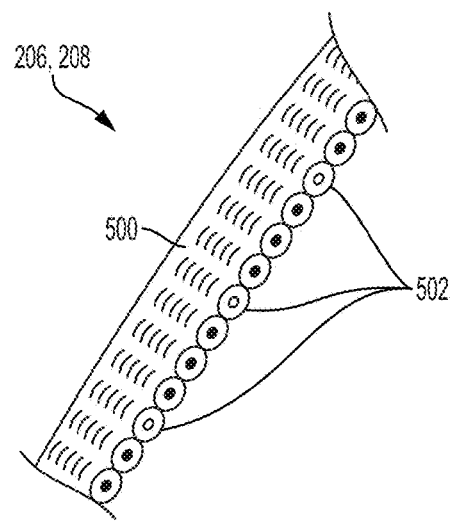

As depicted in FIG. 5, in certain embodiments one or both of the shoulder belt 206 and/or the lap belt 208 include a mesh component 500 (e.g., a webbing) that include sensible elements 502 embedded therein. In certain embodiments, the sensible elements 502 are inserted and/or embedded into the mesh component 500 as shown in FIG. 5. Also in certain embodiments, the sensible elements 502 comprise metallic elements; however, this may vary in other embodiments. In various embodiments, these elements may be oriented across the mesh component so that the mesh component could still bend around a guideloop, a latch plate, a retractor, a child restraint, and an occupant.

Figure 6A:
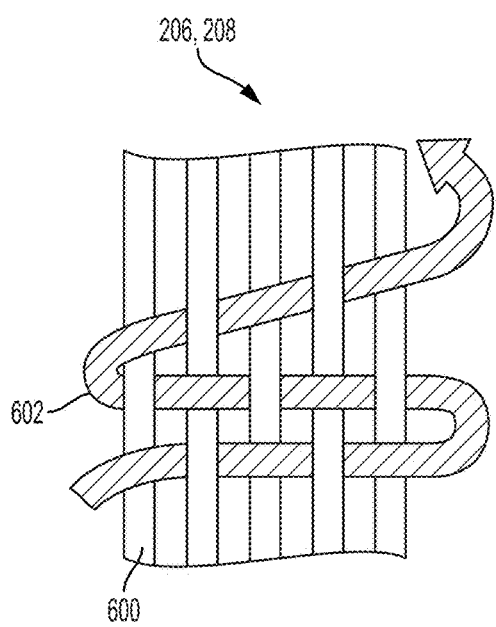
Figure 6B:
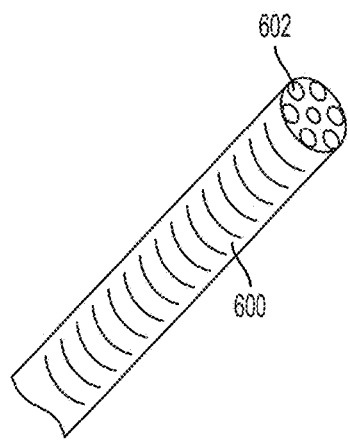

As depicted in FIGS. 6A and 6B, in certain embodiments one or both of the shoulder belt 206 and/or the lap belt 208 include a mesh component 600 (e.g., a webbing) that include sensible elements 602 embedded therein. In certain embodiments, the sensible elements 602 are intertwined and/or woven into the mesh component 600 into a thread (e.g. a warp thread and/or one or more other types of threads) as shown in FIGS. 6A and 6B.

As depicted in FIG. 7, in certain embodiments one or both of the shoulder belt 206 and/or the lap belt 208 include a mesh component 710 (e.g., a webbing) that includes a patch 712 that is sewn onto or otherwise affixed to the mesh component 710. In certain embodiments, an inner layer 706 having one or more sensible elements 708 (e.g., metallic RFID tag, and/or magnetic elements, in certain embodiments) are sewn between two outer layers 702, 704 to form the patch 712, and/or are attached between the patch 712 and the mesh component 710, such as the example of FIG. 7. In various embodiments, the mesh component 710 (e.g., seatbelt webbing) may be folded over on itself in an "S" shape to create a pocket in which one or more sensible elements 708 are placed and held in place with stitching that sews the "S" shape portion together. This approach is one means of creating a mechanical stop that supports a latch plate 125 in the unbuckled state.

As depicted in FIG. 8, in certain embodiments one or both of the shoulder belt 206 and/or the lap belt 208 include a mesh component 800 (e.g., a webbing) that includes an applied sensible element 804 that is applied as a coating via one or more applicators 802. In certain embodiments, the applied sensible element 804 may be applied via painting, spraying, printing, rolling, and/or one or more other techniques. In various embodiments (not shown), the mesh component 710 (e.g., seatbelt webbing) may be looped around a latch plate attachment, and the webbing can create a pocket in which one or more sensible elements 708 are placed between the webbing portions and then are held in place with stitching that sews both portions of the webbing to each other.

As depicted in FIG. 9, in certain embodiments one or both of the shoulder belt 206 and/or the lap belt 208 include a mesh component 900 (e.g., a webbing) that includes a dipped on sensible element 902. In certain embodiments, the dipped on sensible element 902 may be applied via dipping a portion of the mesh component 900 into a dipping solution 904.

As depicted in FIG. 10, in certain embodiments one or both of the shoulder belt 206 and/or the lap belt 208 include a mesh component 1000 (e.g., a webbing) that includes a mechanically attached sensible element 1002. In certain embodiments, the mechanically attached sensible element 1002 may comprise a seat belt latch plate (e.g., latch plate 125 of FIG. 2), a mechanical stop that supports a latch plate 125 in the unbuckled state or travel-stop button, and/or one or more other devices.

As depicted in FIGS. 5-10, the sensible elements 126 of FIGS. 1 and 2 may be incorporated in any number of ways to the restraint device 124. These techniques may include, among others, placing the sensible elements 126 in and/or on a webbing of the restraint device 124, embedding the sensible elements 126 into a webbing of the restraint device 124, mechanically attaching the sensible elements 126 to a webbing of the restraint device 124, sewing the sensible elements 126 to a webbing of the restraint device 124, including the sensible elements 126 within or adjacent to a sewn patch (e.g., in an enclosed region between a webbing of the restraint device 124 and a sewn patch), impregnating the sensible elements as a coating on a webbing of the restraint device 124, and/or integrating the sensible elements 126 into at least some threads of a webbing of the restraint device 124, among other possible techniques.

In various embodiments, the latch plate 125 can also contain or have sensible elements 126 attached to it which can be detected by the shoulder belt sensors 210. For instance, in certain embodiments, these sensible elements 126 may be mechanically attached to the metal latch plate stamping, placed under a latch plate cover, be molded into a latch plate cover, or snapped into a latch plate cover.

Also in various embodiments, the sensible elements 126 may comprise one or more metallic components, magnetic components, passive RFID tags, and/or one or more other types of sensible elements. In addition, in various embodiments, the sensible elements 126 utilize one or more patterns to facilitate detection by the sensors 122 and to prevent false positive detections, for example as described below in connection with FIG. 11.

Figure 11:
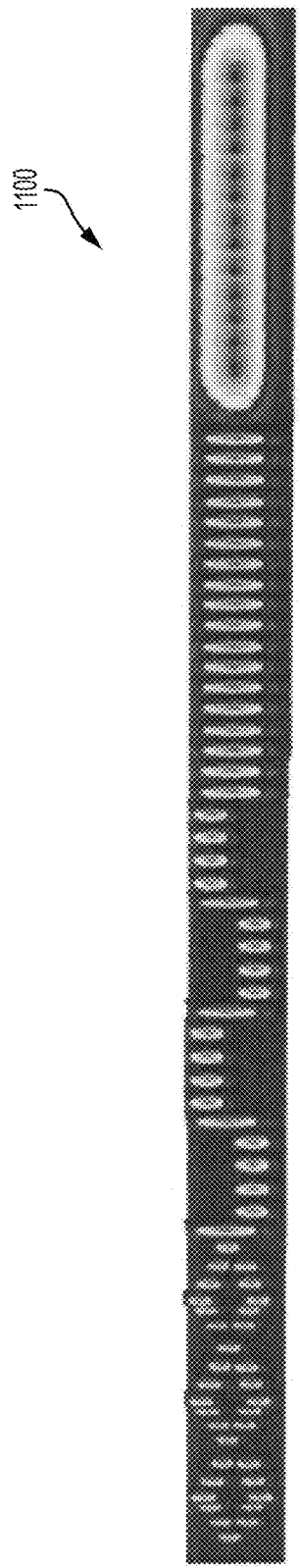
FIG. 11 is a schematic diagram of an exemplary pattern used for the sensible elements embedding within the restraint devices for the vehicle of FIG. 1, in accordance with exemplary embodiments.

FIG. 11 is a schematic diagram of an exemplary pattern 1100 used for the sensible elements 126, in accordance with exemplary embodiments. For example, as used in FIG. 11, the sensible elements 126 may include one or more patterns 1100 that may include distinguishing features, such as fine versus coarse components, open versus filled spaces, geometric patterns, and/or any number of other different features for the pattern 1100. In certain embodiments, each sensible element 126 may include its own pattern 1100. In certain other embodiments, the arrangement of the different sensible elements 126 may comprise a pattern 1100. In various embodiments, the sensors 122 are configured to recognize the patterns 1100 of the sensible elements 126, for example to distinguish the sensible elements 126 from other features of the seat belt system (e.g., the metal latch plate 125, if not used as a sensible element 126) and/or an occupant and/or his or his or clothing or jewelry (e.g., a zipper, a necklace, a watch, a latch or adjustment router for a bra strap or other device, or the like). Also in certain embodiments, the sensors 122 are configured to not provide a "detected" response output (e.g., that would indicate a misrouted restraint device 124) unless the sensors 122 placed a certain distance apart detect at least two apparent sensible elements 126 (e.g., to avoid a false positive response with any of the above-described features such as, an occupant and/or his or her clothing or jewelry, and so on. Also in certain embodiments, the pattern 1100 may be incorporated into the webbing of the restraint device 124, so that the sensors 122 can detect and identify the webbing of the restraint device 124 in space.

FIGS. 12-17 are schematic diagrams showing various exemplary implementations of the seat belt systems 121, including certain latch plates 125, restraint devices 124 (e.g., shoulder belts 206), sensors 122 (e.g., shoulder belt sensors 210) and sensible elements 126 (e.g., shoulder belt sensible elements 214) of FIGS. 1-11, for the vehicle of FIG. 1, in accordance with exemplary embodiments.

Figure 12:
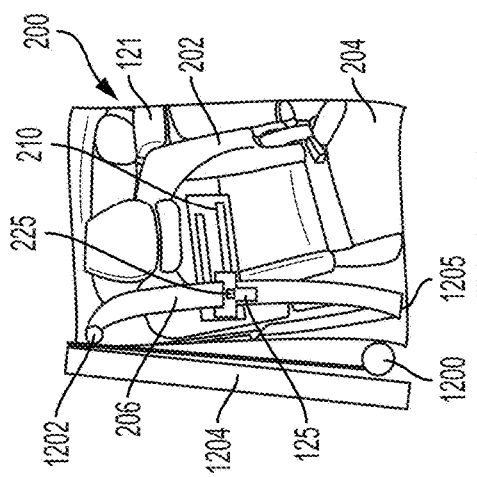

As shown in FIG. 12, in certain embodiments the seat belt system 121 includes a shoulder belt 206 with a latch plate 125, along with a single retractor 1200 disposed proximate a lower part (e.g. under the trim of) a pillar 1204 of the vehicle 100, along with a guide loop 1202 disposed proximate an upper part of the pillar 1204. Also, as depicted in FIG. 12, in various embodiments the shoulder belt 206 is configured to slide through guide loop 1202 into the retractor 1200 until the webbing can be pulled in no further because it is pulled taught between the guideloop and the lower seatbelt anchor 1205. In certain embodiments, the latch plate 125 (or another mechanical stop that supports the unbuckled latch plate 125) of the shoulder belt 206 may comprise a sensible element, such that the depicted shoulder belt sensors 210 in the seat back 202 detect when the shoulder belt 206 is in an unworn state (when the seatbelt is in the stowed state) based on the detection of the latch plate 125 with an optional latch plate sensible element 225 (or another mechanical stop that supports the unbuckled latch plate 125) of the shoulder belt 206 by the sensors 210.

Figure 13:
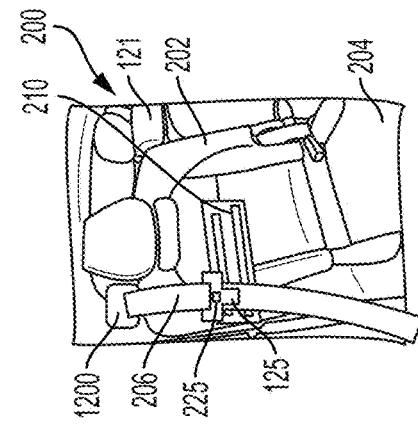

As shown in FIG. 13, in certain other embodiments the seat belt system 121 includes a shoulder belt 206 with a latch plate 125, along with a single retractor 1200 disposed proximate an upper part of the seat back 202. Also, as depicted in FIG. 13, in various embodiments the seat belt system 121 is shelf-mounted in the vehicle 100. In addition, in certain embodiments as depicted in FIG. 13, the shoulder belt 206 is configured to slide through retractor 1200 until webbing can be pulled in no further because it is pulled taught between the guideloop and the lower seatbelt anchor 1205. Similar to the embodiments of FIG. 12, in certain embodiments the latch plate 125 (or another mechanical stop that supports the unbuckled latch plate 125) of the shoulder belt 206 may comprise a sensible element, such that the depicted shoulder belt sensors 210 in the seat back 202 detect when the shoulder belt 206 is in an unworn state (when the seatbelt is in the stowed state) based on the detection of the latch plate 125 with an optional latch plate sensible element 225 (or another mechanical stop that supports the unbuckled latch plate 125) of the shoulder belt 206 by the sensors 210.

Figure 14:
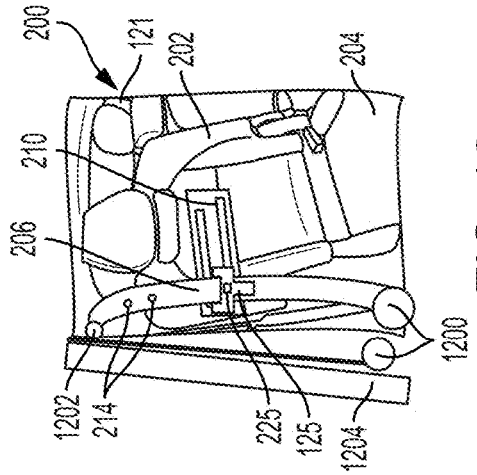
FIGS. 12-17 are schematic diagrams showing various exemplary implementations of the seat belt systems, including certain latches, restraint devices, sensors, and sensible elements of FIGS. 1-11, for the vehicle of FIG. 1, in accordance with exemplary embodiments.

As shown in FIG. 14, in certain embodiments the seat belt system 121 includes a shoulder belt 206 with a latch plate 125, along with two retractors 1200 (one disposed under the trim of a pillar 1204 of the vehicle 100 and another disposed proximate a lower portion of the seat bottom 204), along with a guide loop 1202 disposed proximate an upper part of the pillar 1204. Also, as depicted in FIG. 14, in various embodiments the shoulder belt 206 is configured to slide through guide loop 1202 into the retractors 1200 (depending on the direction) until the seatbelt is pulled taught between the retractors 1200. In certain embodiments, a plurality of sensible elements 214 are disposed throughout the shoulder belt 206 for detection by the sensors 210, as an indication of whether the shoulder belt 206 is being worn correctly by the occupant of the seat 200. In certain other embodiments, a plurality of sensible elements 214, possibly the same elements, are disposed throughout the shoulder belt 206 for detection by the sensors 210, as an indication of whether the seatbelt latch plate is buckled or not (when the seatbelt is in the stowed state).

Figure 15:
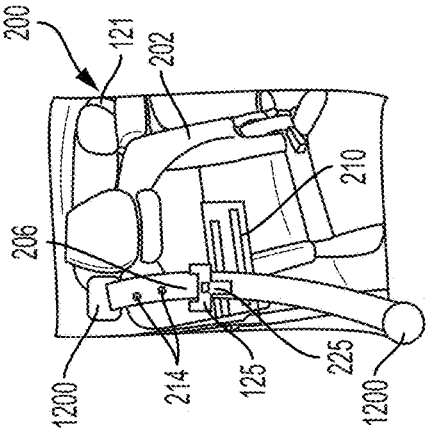
Figure 16:
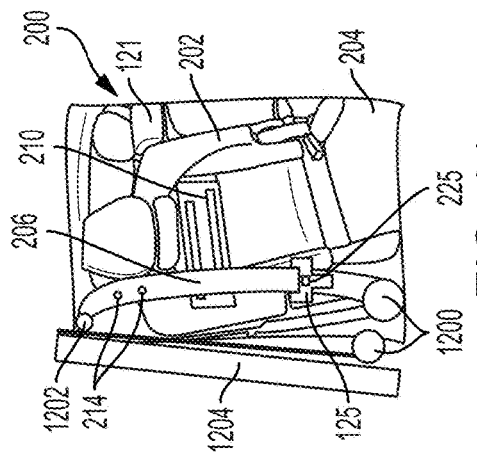

As shown in FIG. 15, in certain embodiments the seat belt system 121 includes a shoulder belt 206 with a latch plate 125, along with two retractors 1200 (one disposed proximate a lower portion of the seat bottom 204, and another disposed proximate an upper part of the seat back 202). Also, as depicted in FIG. 15, in various embodiments the seat belt system 121 is shelf-mounted in the vehicle 100. Also, as depicted in FIG. 15, in various embodiments the shoulder belt 206 is configured to slide into the retractors 1200 (depending on the direction) until the seatbelt is pulled taught between the retractors 1200. In certain embodiments, a plurality of sensible elements 214 are disposed throughout the shoulder belt 206 for detection by the sensors 210, as an indication of whether the shoulder belt 206 is being worn correctly by the occupant of the seat 200. In certain other embodiments, a plurality of sensible elements 214, possibly the same elements, are disposed throughout the shoulder belt 206 for detection by the sensors 210, as an indication of whether the seatbelt latch plate is buckled or not (when the seatbelt is in the stowed state). As shown in FIG. 16, in certain embodiments the seat belt system 121 includes a shoulder belt 206 with a latch plate 125, along with two retractors 1200 (one disposed near a lower portion of a pillar 1204 of the vehicle 100, and another disposed proximate a lower portion of the seat bottom 204), along with a guide loop 1202 disposed proximate an upper part of the seat back 202. Also, as depicted in FIG. 16, in various embodiments the shoulder belt 206 is configured to slide into through guide loop 1202 into the retractors 1200 (depending on the direction) until the seatbelt is pulled taught between the retractors 1200. Similar to the embodiments of FIG. 12, in certain embodiments the latch plate 125 of the shoulder belt 206 may comprise a sensible element, such that the depicted shoulder belt sensors 210 in the seat back 202 detect when the shoulder belt 206 is in an unworn state (when the seatbelt is in the stowed state) based on the detection of the latch plate 125 with an optional latch plate sensible element 225 of the shoulder belt 206 by the sensors 210

Figure 17:
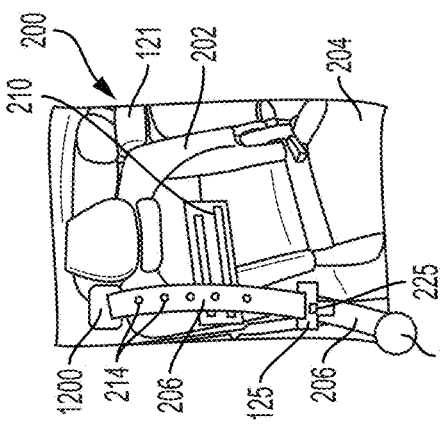

As shown in FIG. 17, in certain embodiments the seat belt system 121 includes a shoulder belt 206 with a latch plate 125, along with two retractors 1200 (one disposed proximate a lower portion of the seat bottom 204, and another disposed proximate an upper part of the seat back 202). Two such seat belt systems 121 are depicted in FIG. 17, for example corresponding to shoulder belt 206 for two occupants of rear seating (or a rear seating bench) of the vehicle 100. Also, as depicted in FIG. 17, in various embodiments each seat belt system 121 is self-mounted in the vehicle 100. Also, as depicted in FIG. 17, in various embodiments for each seat belt system 121, the shoulder belt 206 is configured to slide into the retractors 1200 (depending on the direction) until the seatbelt is pulled taught between the retractors 1200. Similar to the embodiments of FIG. 12, in certain embodiments the latch plate 125 of the shoulder belt 206 may comprise a sensible element, such that the depicted shoulder belt sensors 210 in the seat back 202 detect when the shoulder belt 206 is in an unworn state (when the seatbelt is in the stowed state) based on the detection of the latch plate 125 with an optional latch plate sensible element 225 of the shoulder belt 206 by the sensors 210.

As illustrated in FIGS. 12-17 and described above in connection therewith, the seat belt systems 121 described herein can be used in any number of different types of retractors and accompanying systems. In various embodiments, the sensible elements 126 extend along the length of the seat belt (or a portion thereof), and are thin enough to be rolled up into the retractors 1200 and/or guide loops 1202. For example, in certain embodiments, at least one of the sensible elements 126 is rolled up on the spool of the retractor 1200 when the shoulder belt 206 is not worn and is in its stowed state. In addition, in certain embodiments, the latch plate 125 and/or other mechanical stop that supports the unbuckled latch plate may be utilized as one or more of the sensible elements 126. Also in certain embodiments, for example in which a retractor 1200 is disposed proximate a lower portion of the seat bottom 204 (e.g., at an outboard lower anchor), at least one sensible element is not rolled up on a spool of the retractor 1200 when the shoulder belt 206 is not being worn and is in its stowed state, among other variations. In addition, in certain embodiments that include a two retractor 1200 system, the latch plate 125 for such a two retractor 1200 system is sewn into the webbing (e.g., a mesh component), and a sensible element 126 could be held in place by the stitches or a pocket between webbing portions formed by the stitches.

Figure 18:
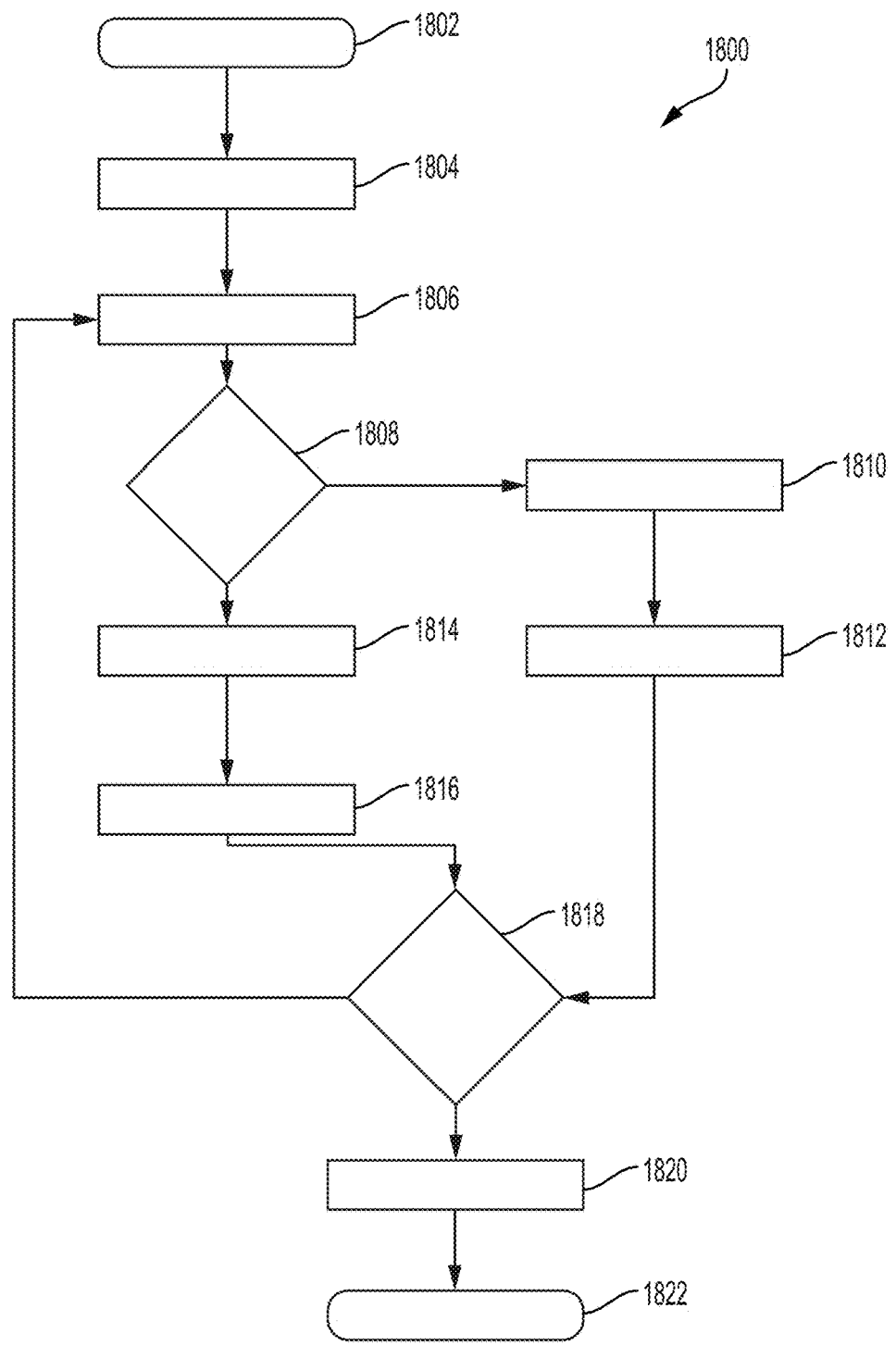
FIG. 18 is a flowchart for a method for detecting when restraint devices are properly applied across occupants of a vehicle, such as the vehicle of FIG. 1 and the various components and implementations of FIGS. 2-17, in accordance with exemplary embodiments.

FIG. 18 is a flowchart for a process (or method) 200 for detecting when seat belt systems are properly applied across occupants of a vehicle, in accordance with various embodiments. The process 1800 can be implemented in connection with the vehicle 100 and the control system 102 of FIG. 1, including the various components and implementations of FIGS. 2-17, in accordance with exemplary embodiments.

As depicted in FIG. 18, the process 1800 begins at step 1802. In certain embodiments, the process 1800 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on), or when the vehicle 100 is otherwise turned on for operation and/or movement, for example as detected via one or more input sensors 111 of FIG. 1. In various embodiments, the process may also begin when a proper sized occupant is detected in a seat via one or more input sensors 111 of FIG. 1. In various embodiments, the process 1800 is performed throughout, and preferably continuously, during operation of the vehicle, with respect to each occupant seat of the vehicle.

The sensors are powered on (step 1804). In various embodiments, the sensors 122 of the seat belt system 121 of FIG. 1 (e.g., corresponding to the shoulder belt sensors 210 and lap belt sensors 212 of FIGS. 2-17) are powered on at step 1804.

Sensor data is obtained (step 1806). In various embodiments, sensor data is obtained via the sensors 122 of the seat belt system 121 of FIG. 1 (e.g., corresponding to the shoulder belt sensors 210 and lap belt sensors 212 of FIGS. 2-17) with respect to the sensible elements 126 of FIG. 1 (e.g., corresponding to the shoulder belt sensible elements 214, the lap belt sensible elements 216 of FIGS. 2-17 and/or the latch plate 125 with optional sensible elements 225 of FIGS. 1-17 when used as a sensible element).

A determination is made as to whether sensible elements are detected in a manner that indicates that a restraint device of the seat belt system is not being worn correctly (step 1808). In certain embodiments, this determination is made by the processor 132 of FIG. 1 using the data of step 1806 from the sensors 122 with respect to detection of the sensible elements 126. In certain other embodiments, this determination may be made by one or more of the sensors 122 themselves (e.g., if such sensors 122 have a processing capability or other "smart" technology). In general, in various embodiments (and subject in certain embodiments to additional determinations, such as those set forth below), when a restraint device (e.g., a shoulder belt, lap belt or latch plate) is detected in proximity to corresponding sensors 122, then this indicates that the restraint device is not (or is potentially not) being worn correctly by the occupant. Conversely, in various embodiments (and subject in certain embodiments to additional determinations, such as those set forth below), when a restraint device (e.g., a shoulder belt lap belt, or latch plate) is not detected in proximity to corresponding sensors 122, then this indicates that the restraint device is being worn correctly by the occupant. Also, as noted above, in certain embodiments the latch plate 125 may comprise a sensible element. In certain embodiments, it is presumed that close proximity of the sensors 122 to the sensible elements 126 would produce a stronger sensed response than when the sensors and the sensible elements are further apart and likely separated by an occupant body region. Also in certain embodiments, this difference in response is used for forming logic for setting thresholds to characterize if the restraint device is not (or is potentially not) being worn correctly or is being worn correctly.

In certain embodiments, during step 1808 one or more related and/or expanded determinations are also made, for example in order to help prevent against false-positive results. For example, in certain embodiments, step 1808 includes one or more determinations as to whether one or more known patterns for the sensible elements 126 are detected by the sensors 122 (e.g., to distinguish the sensing of the sensible elements 126 from one or more other sensible objects, such as parts of the seat belt system 121, occupants' clothing, or the like), and a positive detection report for improper restraint device wearing is only reported if the pattern is detected by the sensors 122. Also in certain embodiments, a positive detection report for improper restraint device wearing only occurs when multiple sensors 122 detect the sensible elements 126 (e.g., to distinguish the sensing of the sensible elements 126 from one or more other sensible objects, such as parts of the seat belt system 121, occupants' clothing, jewelry or the like). In addition, in certain embodiments, a determination is made as to whether the latch plate 125 is in its stowed position, and a positive detection result for improper restraint device wearing is reported when the latch plate 125 is in its stowed position (which, for example, may indicate that an occupant is not currently occupying the seat in question). In other embodiments, one or more additional determinations may also be utilized in combination with the sensors' 122 detection of the sensible elements 126 in ultimately determining whether sensible elements are detected in a manner that indicates that a restraint device of the seat belt system is not being worn correctly (i.e., whether a positive detection result for improper restraint device is provided).

If it is determined in step 1808 that sensible elements are detected in a manner that indicates that a restraint device of the seat belt system is not being worn correctly (i.e., a positive detection result for improper restraint device is provided), then the process proceeds to step 1810. During step 1810, one or more restraint devices of the seat belt system are deemed to not be worn correctly (e.g., misrouted). As a result, during step 1812, one or more actions are taken. In various embodiments, the one or more actions of step 1812 are initiated by the processor 132 of FIG. 1. Also in certain embodiments, the vehicle 100 comprises an autonomous vehicle, and the processor 132 prevents movement and/or other operation of the vehicle 100 while the restraint device is misrouted. In addition, in various embodiments, one or more warnings (e.g., verbal, visual, haptic, and/or other warnings) and/or other actions are provided during step 1812. The process then proceeds to step 1818, discussed further below.

Conversely, if it is determined in step 1808 that sensible elements are detected in a manner that indicates that a restraint device of the seat belt system is being worn correctly (i.e., a positive detection result for improper restraint device is not provided), then the process proceeds instead to step 1814. During step 1814, the restraint devices of the seat belt system are deemed to be worn correctly (e.g., properly routed). As a result, during step 1816, one or more different and/or opposite actions (as compared with the actions of step 1812) are taken. In various embodiments, the one or more actions of step 1816 are initiated by the processor 132 of FIG. 1. Also in certain embodiments, the vehicle 100 comprises an autonomous vehicle, and the processor 132 allows movement and/or other operation of the vehicle 100 while the restraint device is properly routed. The process then proceeds to step 1818, discussed directly below.

During step 1818, a determination is made as to whether the vehicle 100 is still powered on. In certain embodiments, a determination is made by the processor 132 of FIG. 1 as to whether a current vehicle drive or ignition cycle is continuing, based on data provided by one or more input sensors 111 of FIG. 1.

If it is determined in step 1818 that the vehicle is still powered on, then the process returns to step 1806. In various embodiments, steps 1806-1818 thereafter repeat until a determination is made in a subsequent iteration of step 1818 that the vehicle is no longer powered on. Accordingly, in various embodiments, the routing of the seat belt restraint devices continues to be monitored throughout the vehicle drive cycle, including when the vehicle 100 is moving (e.g., either continuously and/or through periodic checks, in various embodiments). Once it is determined that the vehicle is no longer powered on, the sensors (e.g., the sensors 122 of FIG. 1) are powered off at step 1820, and the process terminates at step 1822.

Accordingly, the systems, vehicles, and methods described herein provide for determinations as to proper and improper routing of seat belt restraint systems. In various embodiments, sensors are disposed within occupant seats of the vehicle, and are used to detect sensible elements within or on the seat belt restraint systems, along with certain other determinations in other embodiments, for use in determining whether the seat belt restraint devices are properly routed.

It will be appreciated that the systems, vehicles, and methods may vary from those depicted in the Figures and described herein. For example, the vehicle 100, the control system 102, the seat belt system 121, and/or various components thereof may vary from that depicted in FIG. 1 and described in connection therewith, in various embodiments. It will similarly be appreciated that the steps of the process 1800 may differ from those depicted in FIG. 18, and/or that various steps of the process 1800 may occur concurrently and/or in a different order than that depicted in FIG. 18, in various embodiments. It will similarly be appreciated that the illustrations and examples of FIGS. 2-17 may differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
    one or more sensible elements disposed as part of a restraint device of an occupant seat of a vehicle, the restraint device configured to provide restraint for an occupant of the occupant seat when the restraint device is properly worn by the occupant; and
    one or more sensors disposed within the occupant seat, wherein the one or more sensors are configured to sense the one or more sensible elements when the one or more sensible elements are in proximity to the one or more sensors, as an indication that the restraint device is not properly worn by the occupant, and wherein the one or more sensors disposed in the occupant seat are further configured to detect a stowed latch plate of the restraint device when the restraint device is not worn and is in a stowed state.

2. The system of claim 1, wherein the one or more sensors are disposed in one or more of the following regions of the occupant seat: a seat back, a seat bottom, and a joint between the seat back and the seat bottom.

3. The system of claim 2, wherein the one or more sensors comprise a plurality of sensors disposed in one or more of the following regions of the occupant seat: the seat back, the seat bottom, and the joint between the seat back and the seat bottom.

4. The system of claim 1, wherein:
    the one or more sensible elements are disposed in a shoulder belt of the restraint device; and
    the one or more sensible elements are configured to detect routing of the shoulder belt.

5. The system of claim 1, wherein:
    the one or more sensible elements are disposed in a lap belt of the restraint device; and
    the one or more sensible elements are configured to detect routing of the lap belt.

6. The system of claim 1, wherein the one or more sensible elements are one of a) placed in proximity to, b) embedded into, and c) attached to a webbing of the restraint device.

7. The system of claim 6, wherein the one or more sensible elements comprise one of a metallic sensible element, a magnetic sensible element, and an RFID tag.

8. The system of claim 6, wherein the one or more sensible elements include a sensing element pattern in proximity to the webbing that is detected by the one or more sensors.

9. The system of claim 8, further comprising:
    the occupant seat.

10. The system of claim 1 wherein:
    the one or more sensors disposed within the occupant seat do not sense below a detection threshold the one or more sensible elements in the restraint device when the restraint device is properly worn by the occupant; and
    the one or more sensors disposed within the occupant seat do sense above a detection threshold the one or more sensible elements in a restraint device when the restraint device is improperly worn by the occupant.

11. The system of claim 1, wherein the response strength from the sensor varies with the distance of the sensible element to the sensor with a stronger response for a closer distance than for a longer distance.

12. The system of claim 1, further comprising:
    a processor configured to take an action when the restraint device is not properly worn by the occupant.

13. The system of claim 12, wherein the processor is configured to take the action if, and only if, the restraint device is determined to not be properly worn by the occupant based on the detection of at least two of the sensible elements of the restraint device by the sensors.

14. The system of claim 1, further comprising:
    the restraint device.

15. A vehicle comprising:
    a body;
    one or more occupant seats disposed within the body for an occupant of the vehicle; and
    for each occupant seat:
        a restraint device configured to provide restraint for the occupant when the restraint device is properly worn by the occupant;
        one or more sensors disposed within the occupant seat; and
        one or more sensible elements disposed as part of the restraint device;
        wherein the one or more sensors are configured to sense the one or more sensible elements when the one or more sensible elements are in proximity to the one or more sensors, as an indication that the restraint device is not properly worn by the occupant, and wherein the one or more sensors disposed within the occupant seat are further configured to detect a stowed latch plate of the restraint device when the restraint device is not worn and is in a stowed state.

16. The vehicle of claim 15, further comprising:
a processor that is configured to take an action when the restraint device is not properly worn by the occupant.

17. The vehicle of claim 15, wherein the processor is configured to take the action if, and only if, the restraint device is determined to not be properly worn by the occupant based on the detection of at least two of the sensible elements of the restraint device by the sensors.

18. A method comprising:
detecting, via one or more sensors disposed within an occupant seat of a vehicle, one or more sensible elements that are disposed as part of a restraint device of the vehicle, wherein the restraint device is configured to provide restraint for an occupant of the occupant seat when the restraint device is properly worn by the occupant, and wherein the detecting is based in part on whether the one or more sensors disposed in the occupant seat detect a stowed latch plate of the restraint device when the restraint device is not worn and is in a stowed state; and
taking an action, via a processor, when the restraint device is not properly worn by the occupant.

19. The method of claim 18, wherein:
the vehicle comprises an autonomous vehicle; and
the step of taking the action comprises not allowing movement of the autonomous vehicle when the restraint device is not properly worn by the occupant.

20. The method of claim 18, wherein the step of taking the action, via the processor, is performed if, and only if, the restraint device is determined to not be properly worn by the occupant based on the detection of at least two of the sensible elements of the restraint device by the sensors.

* * * * *